May 29, 1951 R. H. GODDARD 2,555,081
MEANS FOR SUPPLYING LIQUIDS TO AN ANNULAR
ROTATING COMBUSTION CHAMBER
Filed March 26, 1946

INVENTOR.
ROBERT H. GODDARD, Deceased.
ESTHER C. GODDARD, Executrix.
BY Chas. T. Hawley
ATTY Patented May 29, 1951

2,555,081

UNITED STATES PATENT OFFICE 2,555,081

MEANS FOR SUPPLYING LIQUIDS TO AN ANNULAR ROTATING COMBUSTION CHAMBER

Robert H. Goddard, deceased, late of Annapolis, Md., by Esther C. Goddard, executrix, Paxton, Mass., assignor of one-half to The Daniel and Florence Guggenheim Foundation, New York, N. Y., a corporation of New York Application March 26, 1946, Serial No. 657,106

4 Claims. (Cl. 60—35.6)

This invention relates to combustion chambers as commonly used in rocket and aircraft propulsion.

It is the general object of the invention to provide a single combustion chamber of large capacity to take the place of a plurality of relatively small combustion chambers grouped together.

To the accomplishment of this object, an annular combustion chamber is formed with a reentrant axial wall portion. A further feature of the invention is the provision of a single discharge nozzle for a large annular combustion chamber, which nozzle is of relatively reduced diameter and is axially disposed.

The invention further relates to arrangements and combinations of parts which will be hereinafter described and more particularly pointed out in the appended claims.

Prepared forms of the invention are shown in the drawing, in which

Figure 1:
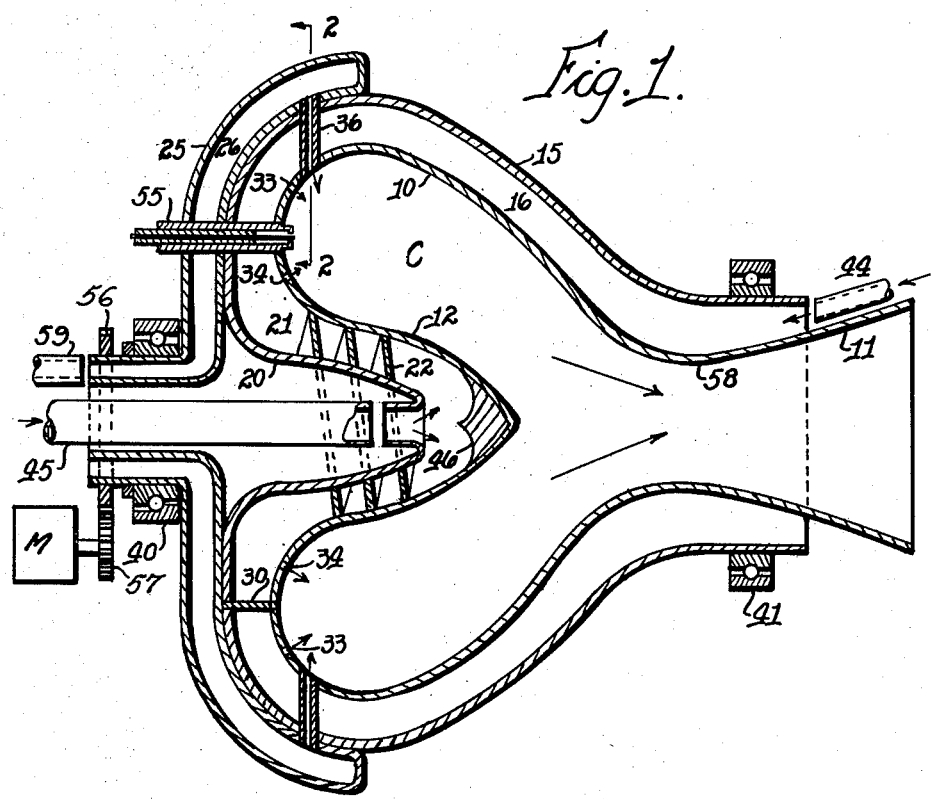
Fig. 1 is a sectional side elevation of a rotatable combustion chamber embodying these improvements.
Figure 2:
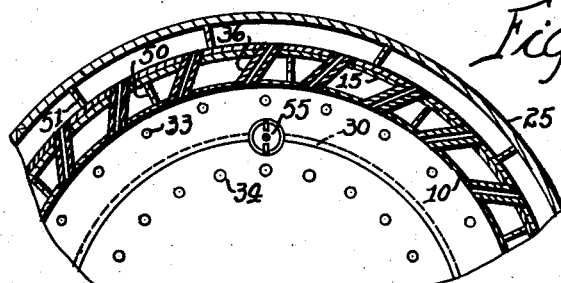
Fig. 2 is a partial sectional end elevation, taken along the line 2—2 in Fig. 1.

Referring to Figs. 1 and 2, a rotary combustion chamber C is shown having a casing 10 and a discharge nozzle 11 and also provided with a reentrant wall portion 12 which is axially disposed and which coacts with the casing 10 to provide an annular or toroidal combustion space.

The chamber C is provided with an exterior casing 15 forming a cooling jacket space 16, and the reentrant portion 12 is provided with an interior casing 20 coacting with the reentrant portion 12 to form a cooling jacket space 21.

A helical partition 22 holds the parts 12 and 20 in coaxial spaced relation. A third jacket casing 25 may be provided outside of the rear portions of the jacket casing 15 and enclosing a third cooling jacket space 26.

A partition 30 separates the jacket spaces 16 and 21, and feed openings 33 and 34 are provided from the spaces 16 and 21 to the chamber C. The jacket space 26 is connected to the combustion chamber by annular series of tubes 36 extending through the jacket space 16 as shown in Fig. 2 and preferably disposed at a substantial angle to the radius, as also shown in Fig. 2.

The combustion chamber C and the associated jackets are rotatably mounted on bearings 40 and 41, preferably of anti-friction type, and with the bearing 40 designed to resist the axial thrust of the combustion gases toward the right in Fig. 1.

One combustion liquid, as liquid oxygen, may be fed to the jacket space 16 of the rotating chamber through a fixed supply pipe 44, and a second combustion liquid, as gasoline, may be fed through a second fixed supply pipe 45 to the jacket space 21. A spreader 46 is provided within the reentrant wall portion 12 to divert the gasoline to all portions of the jacket space 21.

As the gasoline passes outward through the jacket space 21 to the feed openings 34, the helical partition 22 coacts with centrifugal force to throw the gasoline outward, so that the wall portion 12 is effectively cooled.

Axially disposed partitions 50 and 51 (Fig. 2) hold the jacket casings 15 and 25 in accurately spaced relation to the wall 10 of the chamber C. Any suitable ignition device 55 may be provided to start combustion in the chamber C. Combustion chamber C may be rotated by a motor M having a pinion 57 engaging a gear 56 (Fig. 1) on the combustion chamber The operation of the improved combustion chamber will be readily apparent. Gasoline fed through the supply pipe 45 to the jacket space 21 will be sprayed into the chamber C through the feed openings 34. Liquid oxygen or other suitable oxidizing liquid will be fed through the supply pipe 44 to the jacket space 16 from which it will be sprayed into the combustion chamber through the feed openings 33. These sprays of combustible liquids, introduced through the feed openings 33 and 34, intersect shortly after entering the combustion chamber and ignite in the toroidal rear portion of the combustion chamber. The combustion gases are forced outward through the reduced axial opening 58 to the nozzle 11, from which they are discharged.

A single combustion chamber of large capacity is thus made effectively operative, as the toroidal mixing locus is proportionately large as compared with the remaining part of the chamber.

If it is desired to introduce water or any other third liquid into the combustion chamber, such third liquid may be fed through a supply pipe 59 to the jacket space 26 and through the tubes 36 to the combustion chamber C. If the tubes 36 are inclined as shown in Fig. 2, the third liquid will be introduced more or less tangentially of the chamber wall 10 and will provide a protective cooling film along the inner face of the wall 10.

Centrifugal action in all of the jacket spaces will draw the liquids into the jackets and will substantially prevent leakage at the open connections with the supply tubes.

Figure 3:
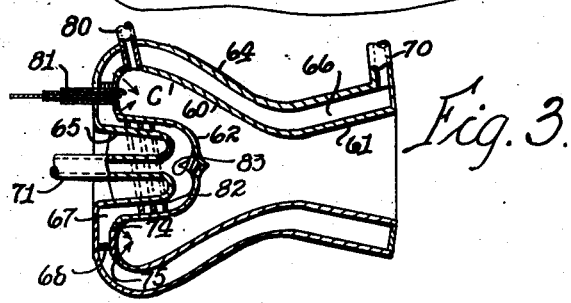
Fig. 3 is a longitudinal sectional view of a stationary combustion chamber also embodying the invention.

In Fig. 3, a corresponding but more simple construction for a stationary combustion chamber is shown. The combustion chamber C' is provided with an outer wall 60, a discharge nozzle portion 61 and a reentrant portion 62, all as in the construction previously described. An outer casing 64 and an inner casing 65 provide jacket spaces 66 and 67, separated by an annular partition 68.

A supply pipe 70 is connected to the jacket space 66 and an axial supply pipe 71 is connected to the jacket space 67. Gasoline provided by the supply pipe 71 is sprayed through feed openings 74 and liquid oxygen provided by the supply pipe 70 is sprayed through feed openings 75.

A third cooling liquid such as water may be supplied to the chamber C through an additional pipe 80, and any suitable ignition device 81 may be provided. A helical partition 82 braces the walls of the reentrant portion 62, as in the form previously described, and a spreader 83 is provided in the front end of the reentrant portion 62.

The construction shown in Fig. 3 retains the advantage of providing a large toroidal mixing locus surrounding a reentrant portion, as 62, and the additional advantage of having a single discharge nozzle axially disposed and of relatively small diameter as compared with the volume of the mixing locus.

Having thus described the invention and the advantages thereof, it will be understood that the invention is not to be limited to the details herein disclosed, otherwise than as set forth in the claims, but that what is claimed is:

1. In a combustion apparatus, an annular combustion chamber having an outer wall and having an axial discharge nozzle at one end of said chamber and having a reentrant axial portion at the opposite end of said chamber, which reentrant portion forms with said outer wall a toroidal combustion space in said combustion chamber and communicating with said axial nozzle, means to rotate said combustion chamber, a casing providing a jacket space for said combustion apparatus, a partition in said jacket space which divides said jacket space into a relatively large annular space portion surrounding said chamber and nozzle and a relatively small annular space portion within said reentrant axial chamber portion, means to feed one combustion liquid to said large jacket space portion, means to feed a portion of a second combustion liquid to said small jacket space portion, one of said liquids being fuel and the other an oxidizer, and means to feed said two liquids from said jacket space portions to said combustion chamber along intersecting paths.

2. In a combustion apparatus, a combustion chamber, means to rotate said chamber, means to deliver a combustion liquid to said chamber, an outer wall, a reentrant axial wall portion providing with said outer wall a toroidal combustion space, a casing within said reentrant portion and spaced therefrom to provide a jacket space, a helical bracing partition mounted in said jacket space, and axial means to supply a second combustion liquid to the rear end portion of said jacket space, one of said liquids being fuel and the other an oxidizer, and said chamber having feed openings in its forward wall communicating with said jacket space and feeding said second combustion liquid to said chamber from said jacket space.

3. In a combustion apparatus, a rotatable combustion chamber having an axial reentrant portion, means to rotate said chamber, casings providing jacket spaces surrounding said chamber and within said reentrant portion, means to supply combustion and oxidizing liquids to said jacket spaces, said chamber having feed openings in its forward end wall from said jacket spaces to said chamber, an additional casing forming an outer and forward jacket space for an inert cooling liquid, and means to feed said inert liquid from said third jacket space to said combustion chamber.

4. In a combustion apparatus, a rotatable combustion chamber having an axial reentrant portion, means to rotate said chamber, casings providing jacket spaces surrounding said chamber and within said reentrant portion, means to supply combustion and oxidizing liquids to said jacket spaces, said chamber having feed openings in its forward end wall from said jacket spaces to said chamber, an additional casing forming an outer and forward jacket space for an inert cooling liquid, and means to feed said inert liquid from said third jacket space to said combustion chamber and comprising a plurality of tangentially disposed feed tubes.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
| --- | --- | --- |
| 2,407,852 | Smith | Sept. 17, 1946 |
| 2,412,266 | Hoagland | Dec. 10, 1946 |

OTHER REFERENCES

"Astronautics," of March 1944, pages 11–13.